United States Patent
Basey

[19]

[11] Patent Number: 5,975,704
[45] Date of Patent: Nov. 2, 1999

[54] MULTIMEDIA PROJECTION SYSTEM WITH IMAGE QUALITY CORRECTION

[75] Inventor: Gary D. Basey, Portland, Oreg.

[73] Assignee: In Focus Systems, Inc., Wilsonville, Oreg.

[21] Appl. No.: 09/030,609

[22] Filed: Feb. 25, 1998

Related U.S. Application Data

[63] Continuation of application No. 08/781,674, Jan. 10, 1997, Pat. No. 5,722,752.

[51] Int. Cl.$^6$ .................................................. G03B 21/14
[52] U.S. Cl. ................................. 353/20; 353/119; 349/5
[58] Field of Search ................................. 353/8, 20, 69, 353/70, 119; 349/5, 7, 96, 99, 102, 103; 359/501, 500

[56] References Cited

U.S. PATENT DOCUMENTS

| | | | |
|---|---|---|---|
| 3,177,761 | 4/1965 | Redner | 359/501 |
| 3,315,391 | 4/1967 | Labe et al. | 359/501 |
| 3,600,076 | 8/1971 | Synder | 353/20 |
| 4,838,655 | 6/1989 | Hunahata et al. | 353/20 |
| 5,048,931 | 9/1991 | Magocs | 353/20 |
| 5,092,671 | 3/1992 | Van Os | 353/119 |
| 5,255,029 | 10/1993 | Vogeley et al. | 353/20 |
| 5,694,164 | 12/1997 | Choi | 353/8 |

FOREIGN PATENT DOCUMENTS 1-50037  2/1989  Japan .................................. 353/20

*Primary Examiner*—William Dowling
*Attorney, Agent, or Firm*—Timothy M. Carlson

[57] ABSTRACT

A multimedia projector comprises a optical frame that mounts, from back to front, a light source, a back fresnel lens, a back polarizer, an LCD display object, a front polarizer, a front fresnel lens, and a front lens group for projecting images formed by the LCD display object. To provide contrast adjustment, a contrast adjustment mechanism is attached to the back polarizer to permit the manual selective tilting of the back polarizer about an axis extending perpendicular to the front polarizer, in order to optimize contrast of images projected by the front lens group.

5 Claims, 5 Drawing Sheets

MULTIMEDIA PROJECTION SYSTEM WITH IMAGE QUALITY CORRECTION

This application is a continuation of U.S. patent application Ser. No. 08/781,674, filed Jun. 10, 1997 issued as U.S. Pat. No. 5,722,752 on Mar. 3, 1998.

FIELD OF THE INVENTION

The present invention pertains to an image projection system, and in particular to projection optical path permitting image quality correction.

BACKGROUND AND SUMMARY OF THE INVENTION

Projections systems have been used for years to project motion pictures and still photographs onto screens for viewing. More recently, presentations using multimedia projection systems have become popular for purposes such as sales demonstrations, business meetings, and classroom sessions. In a common mode of operation, multimedia projection systems receive analog video signals from a personal computer (PC). The video signals represent still, partial-, or full-motion display images of the type rendered by the PC. The analog video signals are converted into digital video signals to control a digitally-driven display object, such as a liquid crystal display (LCD) using thin film transistors (TFT), which form display images.

A popular type of multimedia projection system is a projector that incorporates a light source and optical path components upstream and downstream of the LCD to project the display images onto a display screen. An examples of an LCD projector is sold under the trademark LITEPRO by In Focus Systems, Inc. of Wilsonville, Oreg., the assignee of the present application.

Significant effort has been invested into developing projectors producing high-quality images. However, the optical performance of conventional projectors is often less than satisfactory. For instance, image degradation due to keystone distortion and low image contrast occurs in many conventional projectors.

Keystone distortion occurs when a projector is oriented at an angle to the horizontal during projection. Often such angled orientation causes the width of the projected image field to vary linearly from top to bottom (hence the term "keystone"). Keystone distortion distorts projected images, especially adjacent the top and bottom of the image field, and appears unprofessional. While some conventional projectors have a set keystone correction built into the projector based on a preferred projector mounting angle, such correction does not work when the projector is mounted at an angle other than the preferred. No projector offers convenient, manually operated keystone correction.

Image contrast is also often less than optimal in conventional projectors. Image contrast is defined as the ratio of brightness between the whitest and blackest portions of an image. Degraded contrast often results from polarizing sheets being misaligned with respect to the LCD during projector manufacture. Misaligned polarizers degrade contrast by lightening black areas of an image while darkening white areas. To optimize contrast, some projectors include polarizing sheets that are permanently built into the LCD assembly in an optimal orientation adjacent the LCD. While such LCD assemblies provide improved contrast, they tend to create waste in that the entire LCD assembly is scrapped when one component fails. Thus, in the event of LCD failure, the functional polarizing sheet would also be scrapped.

Thus, in light of these disadvantages, it is a principle object of the present invention to provide a projector with a keystone distortion correction mechanism that can be conveniently adjusted by a projector user.

It is another object of the present invention to provide a projector with a contrast optimization mechanism that can be conveniently adjusted during manufacture or servicing of the projector.

It is a further object of the present invention to provide a projector with a contrast optimization mechanism that permits replacement of individual components of the LCD assembly, without requiring that the entire LCD assembly to be scrapped in the event of component failure.

In accordance with a preferred embodiment of the present invention, a multimedia projector is provided with an optical frame that mounts, from back to front, a light source, a back fresnel lens, a back polarizer, an LCD display object, a front polarizer, a front fresnel lens, and a front lens group for projecting images formed by the LCD display object. To provide keystone distortion correction of projected images, the front fresnel lens is manually and selectively tiltable about an axis extending parallel with the plane of the LCD display object. The selective tilting is accomplished by a manually movable fresnel actuator with a cammed surface. A control arm extends between the fresnel actuator and the fresnel lens, and rides on the cammed surface such that a relatively large movement of the fresnel actuator produces a relatively small adjustment in tilt of the fresnel lens in order to permit fine adjustment of the fresnel lens tilt.

In another aspect of the present invention, manual contrast adjustment is provided by a contrast adjustment mechanism attached to the back polarizer. The adjustment mechanism permits the manual selective tilting of the back polarizer about an axis extending perpendicular to the front polarizer, in order to optimize contrast of images projected by the front lens group.

DETAILED DESCRIPTION OF PREFERRED EMBODIMENTS

Figure 1:
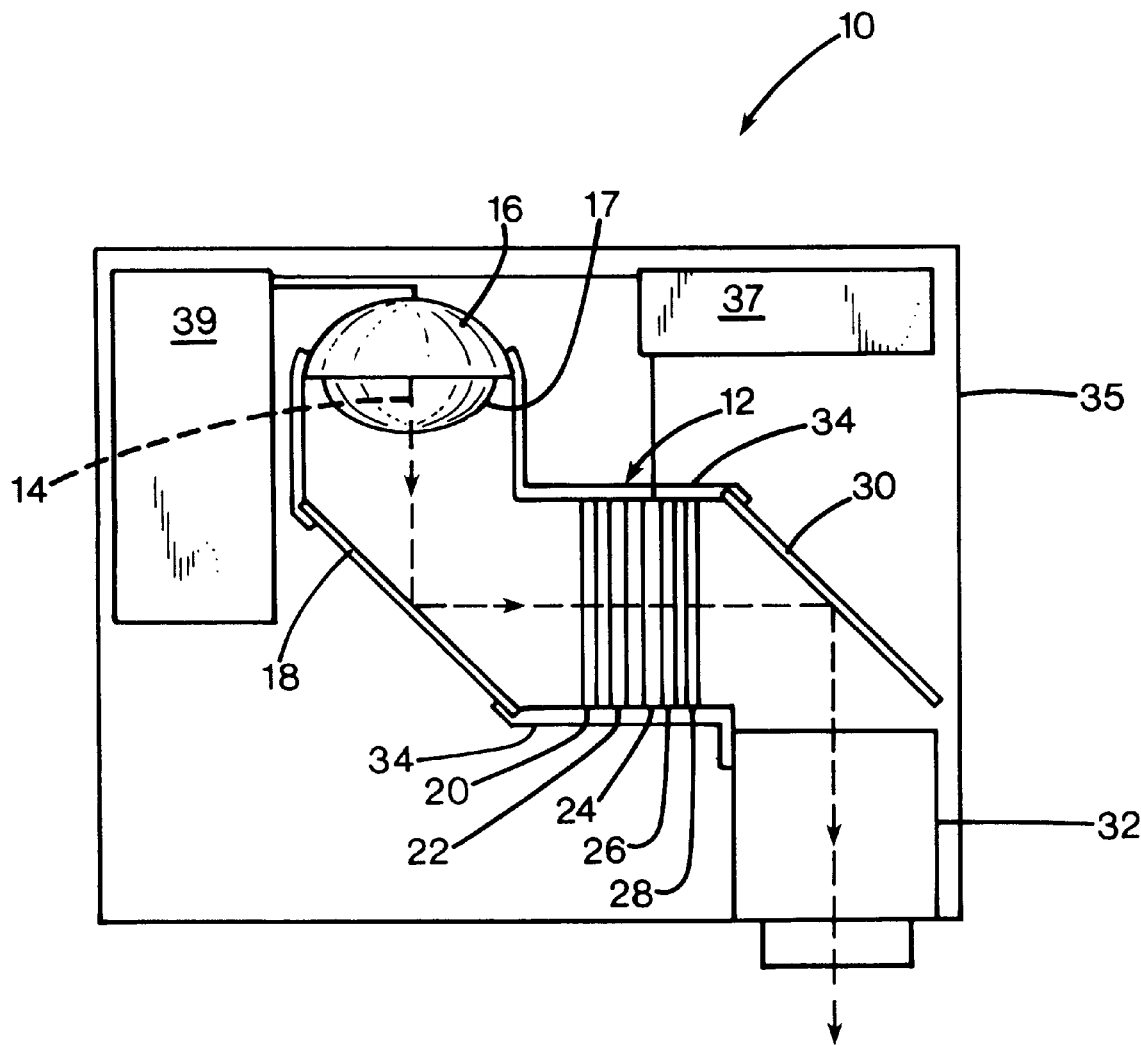
FIG. 1 is schematic plan view of a projector incorporating an keystone correction mechanism and contrast optimization mechanism in accordance with the present invention.

FIG. 1 schematically depicts a multimedia projector 10 in accordance with the present invention. The projector 10 has a optical system 12 defining a "zig-zag" shaped optical path 14 through the projector. The optical system comprises, from back to front, a light source 16, an optional condenser lens 17, a back mirror 18, a back fresnel lens 20, a back polarizer 22, a display object 24 preferably of LCD type, a front polarizer 26, a front fresnel lens 28, a front mirror 30, and a front lens system 32. The optical system is held together by an optical frame 34, and is enclosed by a projector housing 35. An LCD drive electronics unit 37, which includes a CPU, is electrically connected to the LCD display object 24. A power supply 39 is electrically connected to the light source 16 and LCD drive electronics unit 37.

The light source 16, preferably a metal halide lamp, is powered by the power supply 39 to generate light that is condensed by the condenser lens 17 and reflected by the back mirror 18 at 90° toward the back fresnel lens 20. The light is collimated by the back fresnel lens 20, and is polarized by the back polarizer 22, which is preferably a polarized plastic sheet with a selected pass orientation.

The LCD drive electronics unit 37 controls the LCD display object 24 to modulate polarized light received from the back polarizer 22. The polarized light transmitted through activated pixels in the LCD is rotated by 90°, and the polarized light transmitted through blanked (inactive) pixels in the LCD is not rotated. The front polarizer 24 has a pass orientation that is 90° rotated from that of the back polarizer 22. Thus, the front polarizer 24 passes the rotated light of the activated pixels, and absorbs the nonrotated light of the blanked pixels.

The front fresnel lens 28 converges the modulated light passing through the front polarizer 26, such that the light is reflected by the front mirror 30 at 90° to a focus at the front lens system 32. The front lens system projects the light onto a screen for viewing, and may be of varifocal or zoom type.

Figure 2:
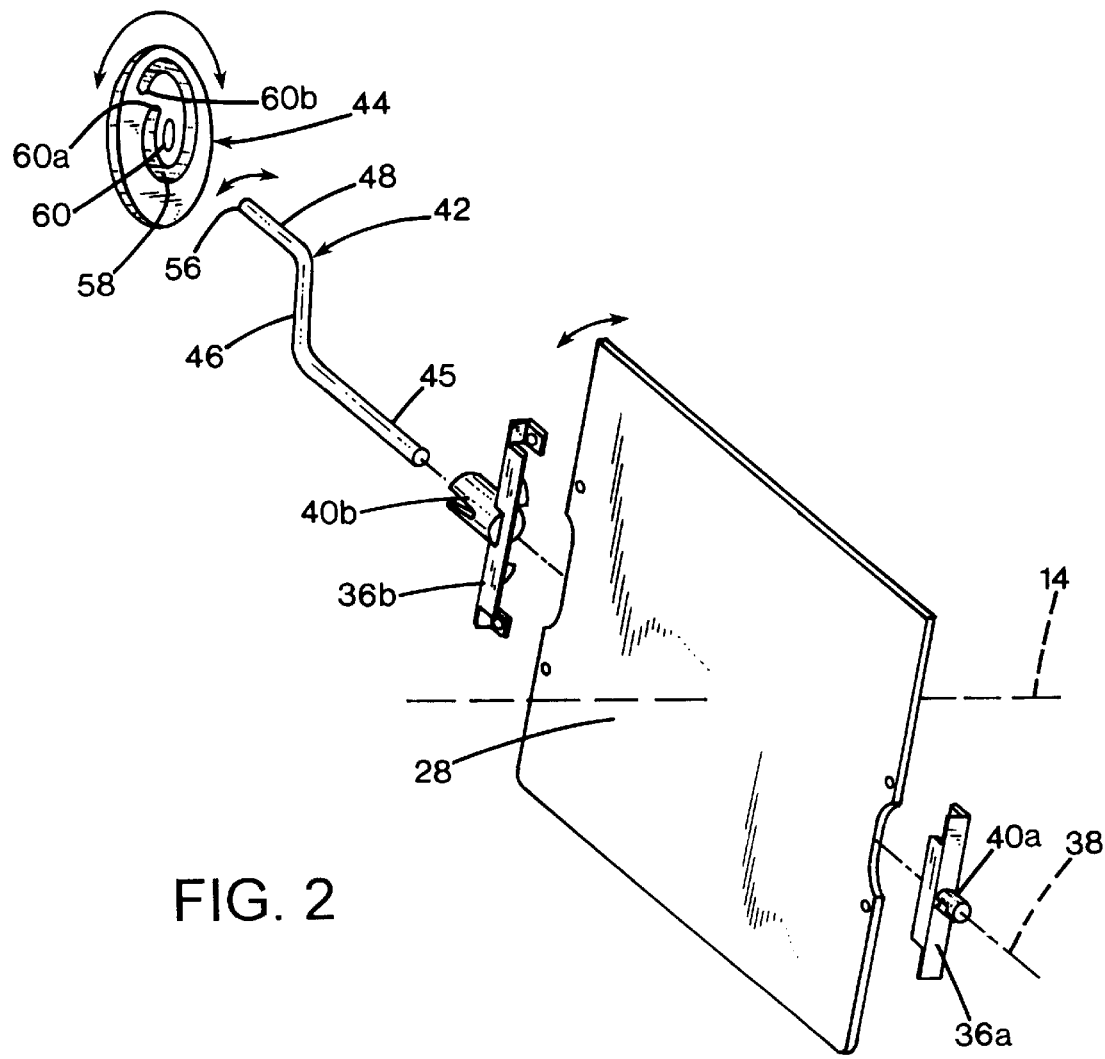
FIG. 2 is an exploded, perspective view of an keystone correction mechanism in accordance with the present invention.
Figure 3:
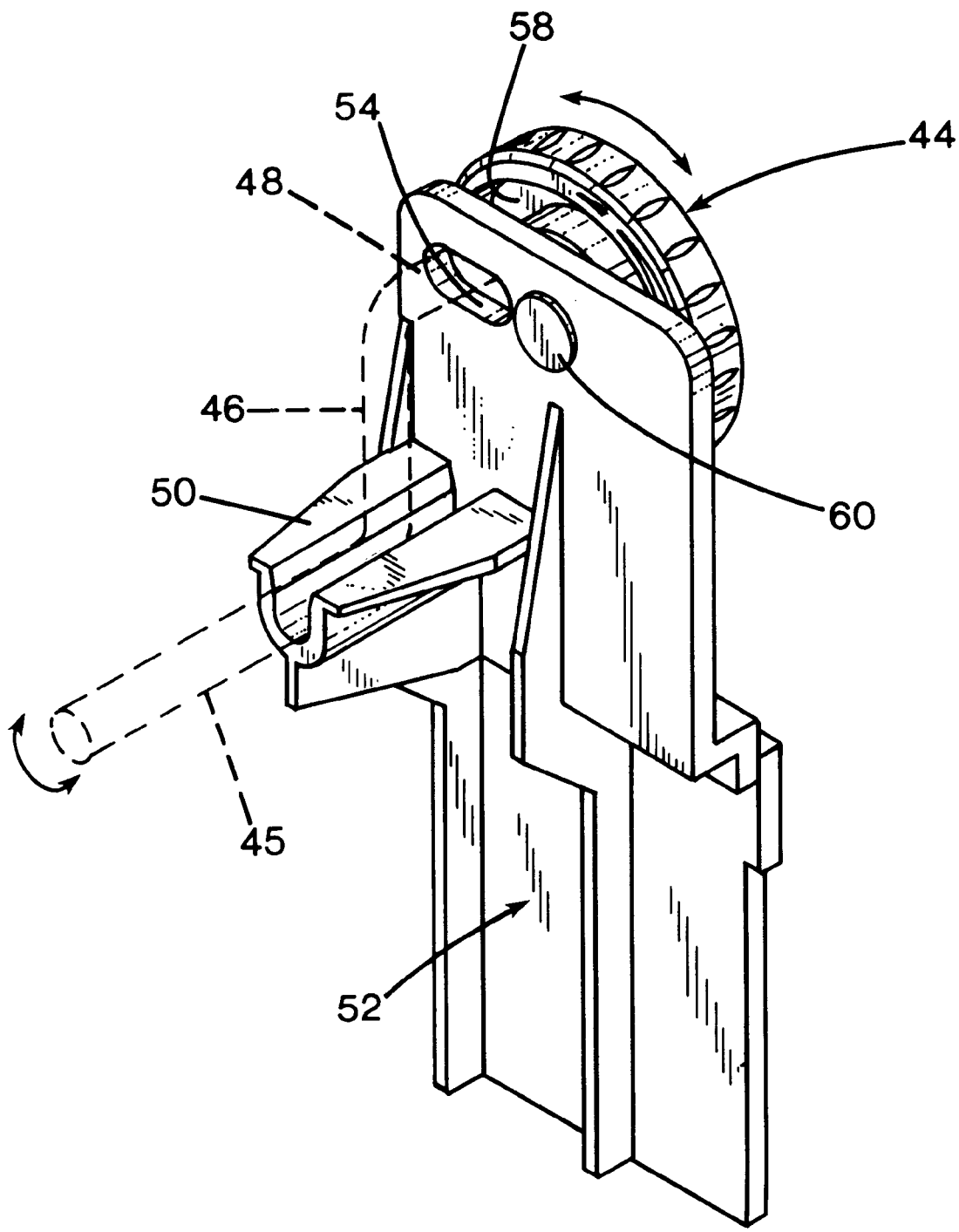
FIG. 3 is a perspective view of a portion of the keystone correction mechanism illustrated in FIG. 2, illustrating additional components of the mechanism.

The keystone correction mechanism will now be described in reference to FIGS. 2 and 3. The front fresnel lens 28 is mounted on a fresnel frame 36a, 36b, with the faceted side of the lens facing back along the optical path 14. Each portion of the fresnel frame has an axle extension 40a, 40b that extend along a horizontal tilt axis 38 that substantially bisects the fresnel lens 20. The axle extensions are pivotally received within opposing orifices in the optical frame 34, thereby permitting tilting of the front fresnel lens 28 about the tilt axis 38.

A control arm 42 extends from the axle extension 40b to a keystone correction actuator 44, which is preferably wheel-shaped. The control arm 42 is generally crank-shaped, with has a first portion 45 that extends along the tilt axis 38 and is received within an orifice in the axle extension 40b. An intermediate second portion 46 of the arm extends perpendicularly from the first portion 45, and a third portion 48 of the arm extends perpendicularly from the second portion 46 parallel to and away from the first portion 45.

The first portion 45 of the arm is held is in a semi-cylindrical race support 50 extends from a keystone correction mechanism frame 52. The keystone correction actuator 44 is rotatably mounted on the opposite side of the mechanism frame 52 from the race support 50. The keystone correction mechanism frame 52 may be formed integrally with the projector housing 35, or may be internally supported within the projector 10. The race support 50 permits rotation of the first portion 45 of the arm as the second and third portions of the arm move about the tilt axis 38.

The third portion 48 of the arm is received through an arcuate slot 54 defined in the frame 52. The end 56 of the third portion 48 is received within a spiral-shaped slot 58 defined in the keystone correction actuator 44. The spiral-shaped slot 58 provides a cam surface against which the end 56 of the control arm 42 rides as the keystone correction actuator 44 is rotated. The spiral-shaped slot 58 extends angularly just more than 360° to permit about a 360° rotation of the keystone correction actuator 44. As best shown in FIG. 2, the radial distance from the center axis 60 of the actuator 44 to the spiral-shaped slot 58 increases from the inner end 60a of the slot to the outer end 60b. Thus, during rotation of the actuator 44, the third portion 48 of the arm moves radially away from the actuator center axis 60 as it rides along the cammed surface of the spiral-shaped slot 58 during actuator rotation. Such movement of the arm third portion 48 rotates the arm about the first portion 45 held in the race support 50. The spiral-shaped slot 58 is radially dimensioned to rotate the control arm approximately 12° about the first portion 45 (i.e. tilt axis 38), as the acutator 44 is rotated approximately 360°. Thus, the keystone correction actuator 44 provides very fine tilt control for the front fresnel lens 28 in order to permit precise elimination of keystone distortion.

The keystone correction actuator 44 is exposed through the top or side of the projector 10, in order to permit convenient manual adjustment by an operator of the projector. When the projector is in operation, keystone distortion of the image field may be corrected by viewing the image field and manually rotating the keystone actuator until the distortion is eliminated. It is also contemplated that the above cam-type keystone adjustment mechanism may be motor-driven, and controlled by a remote.

A contrast adjustment mechanism will now be described, relative to FIGS. 4 and 5. In the preferred embodiment, the contrast adjustment mechanism 64 permits the selective tilting of the back polarizer 22 (indicated in dashed lines) relative to the front polarizer 26 about an axis extending perpendicular to the back and front polarizers 22, 26 (i.e. the optical path 14). In order to achieve maximum image contrast, the pass orientations of the back polarizer 22 and front polarizer 26 must be offset by 90°, so that as much as possible of the rotated activated pixel light is passed by the front polarizer 26, and as much as possible of the unrotated blanked pixel light is absorbed by the front polarizer 26.

Figure 4:
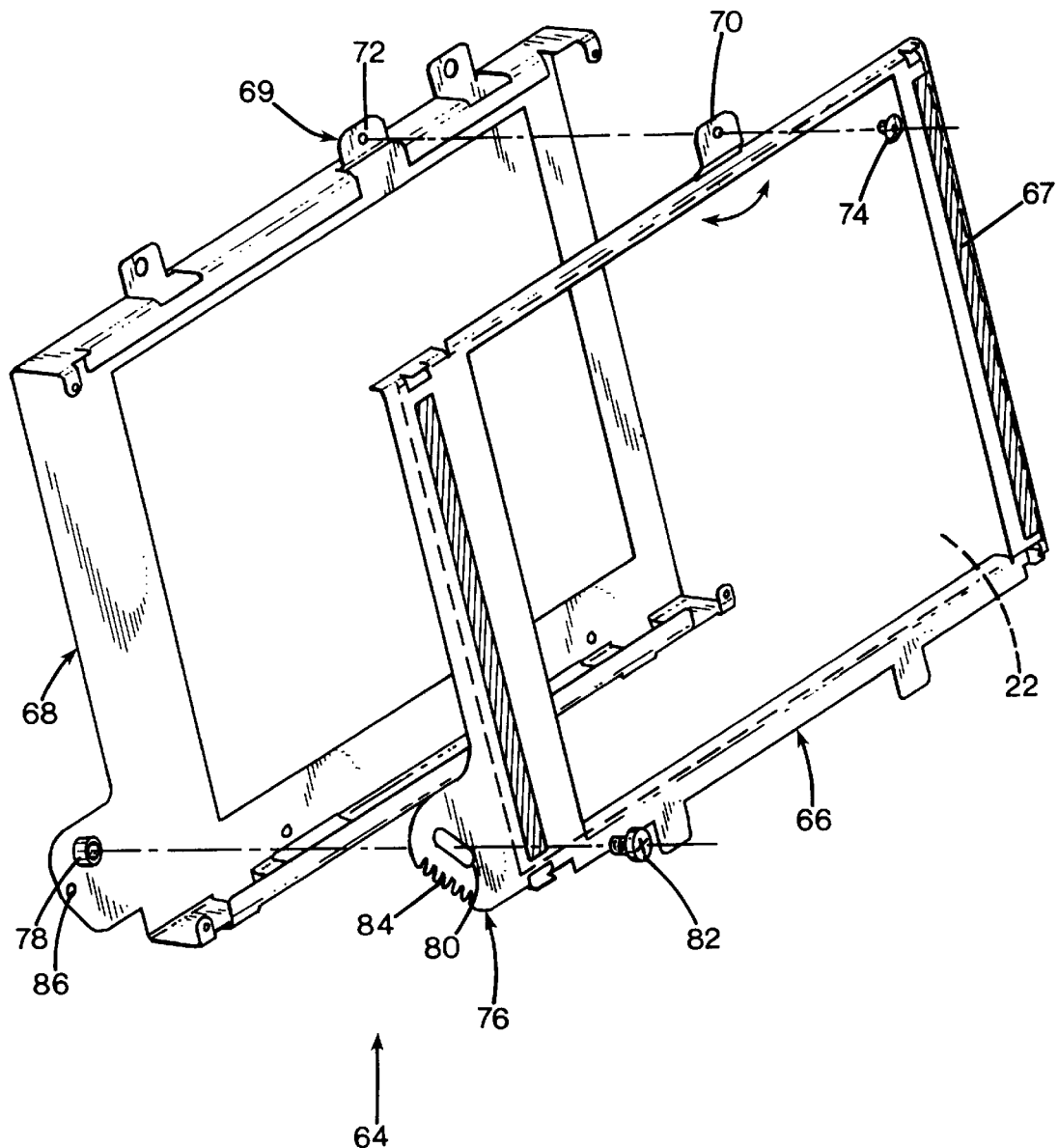
FIG. 4 is an exploded, perspective view of a portion of an image contrast adjustment mechanism in accordance with the present invention.
Figure 5:
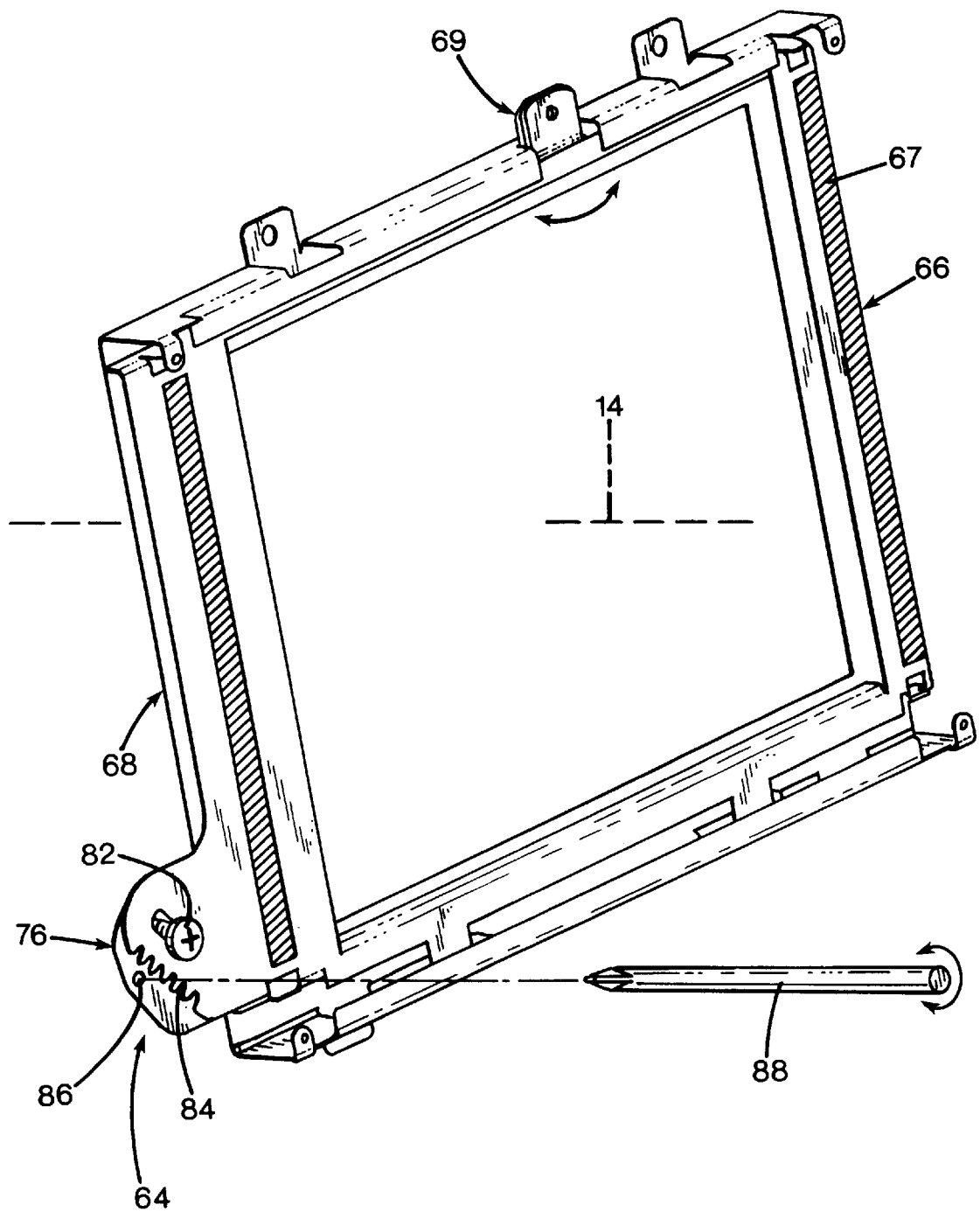
FIG. 5 is a perspective view of the assembled image contrast adjustment mechanism illustrated in FIG. 4.

As shown in FIGS. 4 and 5, the back polarizer 22 is fastened to a polarizer frame 66 by adhesive strips 67 or other fasteners. The polarizer frame 66 is pivotally attached to an anchor frame 68 at a pivot connection 69. The anchor frame is rigidly attached to the optical frame 34 (see FIG. 1). To provide the pivot connection 69, the polarizer frame 66 and the anchor frame 68 have attachment flanges 70, 72, respectively, that extend from edges thereof. The attachment flanges 70, 72 are positioned in registration and are pivotally connected by a rivet 74, or other fastener. Thus, the polarizer frame 66 is tiltable about the rivet 74 relative to the anchor frame 68.

To permit precise adjustment of the back polarizer 22 relative to the anchor frame 68, a tilt adjustment device 76 is located at a corner of the anchor frame 68 and the polarizer frame 70 to govern the tilt adjustment of the back polarizer 22. The tilt adjustment device 76 is comprised of a screw anchor hole 78 formed in the corner of the anchor frame 68. The anchor hole 78 is in registration with an arcuate slot 80 formed in the corner of the polarizer frame 66. The arcuate slot 80 has a center of curvature at the pivot connection rivet 74.

A screw 82 is received through the arcuate slot 80 and is threadable into the screw anchor hole 78, in order to lock the polarizer frame 66 relative to the anchor frame 68. In order to permit the precise positioning of the polarizer frame about the pivot connection 69, a toothed portion 84 is formed adjacent the arcuate slot 80 on an edge of the polarizer frame 66. A positioning hole 86 is formed adjacent the screw anchor hole 78 on the anchor frame 68, so as to be positioned just outboard of the toothed portion 80 of the polarizer frame 66. The head of a toothed tool 88, such as a Philips-type screwdriver, may be inserted by a technician into the positioning hole 86. So positioned, the teeth of the tool 88 intermesh with the toothed portion 84 of the polarizer frame. The toothed tool may then be manually rotated to precisely orient the back polarizer 22 relative to the front polarizer 26 for optimization of image contrast. The present contrast adjustment device permits tilt adjustment well within 1° of the optimal 90° back/front polarizer orientation to provide uniformly excellent image contrast for the present projectors.

It is contemplated that such adjustment may take place during final production assembly of the projector 10. In this case, the adjustment is made by a technician while the projector is projecting a test image upon a contrast-measuring light meter. Such contrast adjustment may also be performed during servicing of the projector. It is contemplated that a minimum image contrast in the order of 200:1 may be achieved using the above adjustment device.

It should be apparent that the invention may be embodied in other specific forms without departing from its spirit or essential characteristics. For instance, the contrast adjustment mechanism 64 could be equally be applied to the front polarizer 26. Accordingly, the described embodiments are to be considered in all respects only as illustrated and not restrictive and the scope of the invention is, therefore, indicated by the appended claims.

What is claimed is:

1. A projector comprising:

an optical frame;

a light source connected to the optical frame;

an LCD display object connected to the optical frame, the LCD display object having an object side and an image side, the LCD display object operable to form images;

a front lens group connected to the optical frame on the image side of the display object for projecting images formed by the LCD display object;

a back polarizer connected to the optical frame on the object side between the LCD display object and the front lens group;

a front polarizer connected to the optical frame on the image side of the LCD display object; and a contrast adjustment mechanism attached to one of the back polarizer and the front polarizer, the contrast adjustment mechanism permitting the selective tilting of the one of the back polarizer and the front polarizer about an axis extending perpendicular to the other of the back polarizer and the front polarizer, in order to optimize contrast of images projected by the front lens group, the contrast adjustment mechanism having a polarizer frame that holds the one of the back polarizer and the front polarizer, the polarizer frame connected to the optical frame at a pivot connection, the polarizer frame having a tilt adjustment device operable to permit manual tilt adjustment of the polarizer frame about the pivot connection to optimize image contrast.

2. The projector of claim 1, wherein the tilt adjustment device has a toothed portion that is intermeshable with a rotatable toothed tool, and rotation of the toothed tool while intermeshed with the toothed portion tilts the polarizer frame about the pivot connection to permit optimized image contrast.

3. The projector of claim 2, (wherein the toothed tool is a Philips-type screw driver that is selectively manually rotated to tilt the polarizer frame about the pivot connection to optimize image contrast.

4. The projector of claim 2, further comprising:

an arcuate slot is defined in the polarizer frame adjacent the toothed portion, the arcuate slot having a center of curvature at the pivot connection, and a fastener extending from the optical frame, the fastener being received through the arcuate slot, the fastener being retractable into the optical frame so as to lock the polarizer plate with respect to the optical frame when the polarizer plate is selectively tilted to provide optimal image contrast.

5. The projector of claim 2, wherein a tool positioning orifice is defined in the optical frame adjacent the toothed portion of the polarizer frame, the orifice receiving the head of the toothed tool whereby the toothed tool is positioned for manual rotation while intermeshed with the toothed portion.

* * * * *

UNITED STATES PATENT AND TRADEMARK OFFICE
CERTIFICATE OF CORRECTION

PATENT NO. : 5,975,704  
APPLICATION NO. : 09/030609  
DATED : November 2, 1999  
INVENTOR(S) : Gary D. Basey Page 1 of 1

It is certified that error appears in the above-identified patent and that said Letters Patent is hereby corrected as shown below:

Column 1  
Line 5, "...filed Jun. 10, 1997..." should read --...filed Jan. 10, 1997...--.

Signed and Sealed this

Third Day of November, 2009

David J. Kappos  
*Director of the United States Patent and Trademark Office*